United States Patent
Peng et al.

(10) Patent No.: US 11,063,783 B2
(45) Date of Patent: Jul. 13, 2021

(54) PASSIVE OPTICAL NETWORK COMMUNICATION METHOD, APPARATUS, AND SYSTEM

(71) Applicant: Huawei Technologies Co., Ltd., Shenzhen (CN)

(72) Inventors: Guikai Peng, Dongguan (CN); Huafeng Lin, Dongguan (CN); Shiwei Nie, Dongguan (CN); Xuming Wu, Wuhan (CN); Liming Fang, Dongguan (CN); Yinghua Dong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/413,811

(22) Filed: May 16, 2019

(65) Prior Publication Data
US 2019/0273634 A1    Sep. 5, 2019

Related U.S. Application Data

(63) Continuation of application No. PCT/CN2016/106270, filed on Nov. 17, 2016.

(51) Int. Cl.
*H04J 14/02*    (2006.01)
*H04L 12/46*    (2006.01)
(Continued)

(52) U.S. Cl.
CPC ....... *H04L 12/4633* (2013.01); *H04B 10/271* (2013.01); *H04B 10/60* (2013.01);
(Continued)

(58) Field of Classification Search
CPC .................................................. H04J 14/0245
See application file for complete search history.

(56) References Cited

U.S. PATENT DOCUMENTS

| 2009/0263130 A1* | 10/2009 | Luo ........................ H04B 10/27 398/58 |
| 2010/0183304 A1* | 7/2010 | Spector ................. H04J 3/1694 398/66 |

(Continued)

FOREIGN PATENT DOCUMENTS

| CN | 101179493 A | 5/2008 |
| CN | 101552772 A | 10/2009 |

(Continued)

*Primary Examiner* — Nathan M Cors
(74) *Attorney, Agent, or Firm* — Slater Matsil, LLP (57) ABSTRACT

A passive optical network communication method, including receiving an Ethernet packet carrying an optical network unit identifier, determining a correspondence between the optical network unit identifier and an optical network unit type according to the optical network unit identifier, determining that an optical network unit that receives the Ethernet packet is a first type of optical network unit, where the optical network unit type includes the first and second type of optical network unit, and a packet receiving rate of the first type is different from that of the second type, determining a correspondence between the optical network unit type and a channel according to the first type, determining a channel corresponding to the first type, encapsulating the Ethernet packet into a gigabit-capable passive optical network encapsulation method (GEM) frame, and sending the GEM frame to the first type of optical network unit using the determined channel.

19 Claims, 7 Drawing Sheets

(51) Int. Cl.
  *H04B 10/27* (2013.01)
  *H04B 10/60* (2013.01)
  *H04Q 11/00* (2006.01)
(52) U.S. Cl.
  CPC ...... *H04J 14/0223* (2013.01); *H04J 14/0227* (2013.01); *H04Q 11/0067* (2013.01); *H04Q 2011/0086* (2013.01)

(56) References Cited

U.S. PATENT DOCUMENTS

| | | | |
|---|---|---|---|
| 2012/0087662 A1* | 4/2012 | Suzuki | H04J 3/1694 398/66 |
| 2014/0126910 A1 | 5/2014 | Luo et al. | |
| 2015/0055955 A1 | 2/2015 | Kim et al. | |
| 2016/0088377 A1* | 3/2016 | Peng | H04L 41/0803 398/45 |
| 2016/0294689 A1* | 10/2016 | Zheng | H04L 45/74 |
| 2017/0054719 A1* | 2/2017 | Zheng | H04J 14/0249 |
| 2017/0064418 A1 | 3/2017 | Tao et al. | |

FOREIGN PATENT DOCUMENTS

| | | |
|---|---|---|
| CN | 101552932 A | 10/2009 |
| CN | 102821029 A | 12/2012 |
| EP | 2621195 A2 | 7/2013 |
| WO | 2013072776 A2 | 5/2013 |
| WO | 2015172279 A1 | 11/2015 |

* cited by examiner

PASSIVE OPTICAL NETWORK COMMUNICATION METHOD, APPARATUS, AND SYSTEM

CROSS-REFERENCE TO RELATED APPLICATIONS

This application is a continuation of International Patent Application No. PCT/CN2016/106270, filed on Nov. 17, 2016, the disclosure of which is hereby incorporated by reference in its entirety.

TECHNICAL FIELD

This application relates to the field of communications technologies, and in particular, to a passive optical network (PON) communication method, an apparatus, and a system.

BACKGROUND

Figure 1:
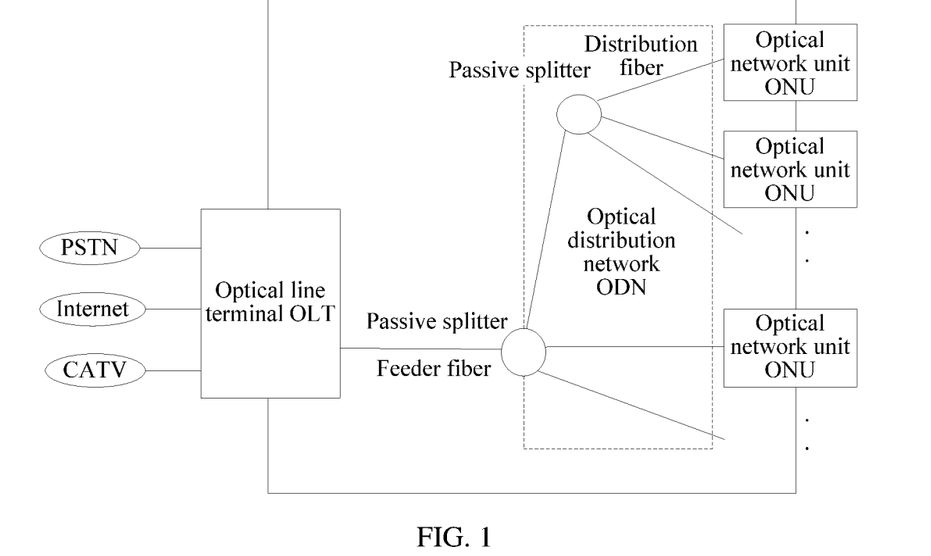
FIG. 1 is a schematic diagram of a passive optical network system in the prior art.

As shown in FIG. 1, a passive optical network (PON) includes an optical line terminal (OLT) at a central office, an optical network unit (ONU) or an optical network terminal (ONT) at a customer premise, and an optical distribution network (ODN). Currently, typical PON technologies are a gigabit-capable passive optical network (GPON), an Ethernet passive optical network (EPON), a 10G-GPON (which may also be referred to as an XG-PON), a 10G-EPON, and a time wavelength division multiplexing passive optical network (TWDM PON).

The OLT provides a network side interface to a PON system, and is connected to one or more ODNs. The ONU provides a user side interface to the PON system, and is connected to the ODN. If the ONU directly provides a function of a user port, such as an Ethernet user port used for Internet access of a personal computer (PC), the ONU is referred to as an optical network terminal (ONT). Without specific description, an ONU and an ONT are collectively referred to as an ONU described below. The ODN is a network including a fiber and a passive optical splitter, and is configured to connect an OLT device and an ONU device, and distribute or multiplex a data signal between the OLT and the ONU. In the PON system, downlink is from the OLT to the ONU; and conversely, uplink is from the ONU to the OLT.

A downlink rate of the GPON is 2.5 Gbps, an uplink rate is 1.25 Gbps, and an uplink wavelength and a downlink wavelength are respectively 1310 nm and 1490 nm. A baud rate of a downlink signal of an XG-PON system is 10 GBaud, namely, a quantity of times of changes of a carrier modulation state per unit time. The XG-PON uses NRZ (Non-Return-to-Zero) coding, there are only two levels for modulation, and each level carries one bit. Therefore, a total line rate is also 10 Gbps, a peak rate of each ONU is 10 Gbps, a downlink wavelength is 1577 nm, and an uplink wavelength is 1270 nm. Currently, the XG-PON is mature and commercialized. An uplink wavelength and a downlink wavelength on the TWDM PON are respectively 1524 nm to 1544 nm and 1596 nm to 1602 nm. In addition, the Institute of Electrical and Electronics Engineers (IEEE) starts to consider setting an NG-EPON standard of 100 Gbps, and a wavelength plan of the NG-EPON standard is in discussion. In general, the PON technology keeps being upgraded towards a direction of a higher rate. As a PON generation increases, how to improve a transmission rate of an entire line is a difficulty that the industry faces.

Figure 2:
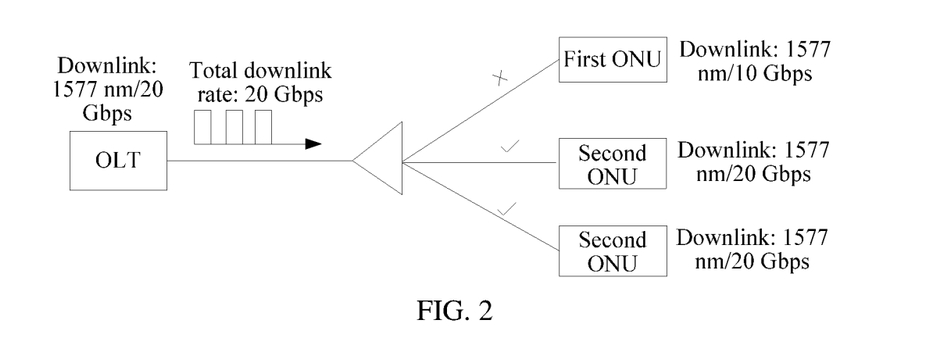
FIG. 2 is a schematic diagram of a passive optical network system in the prior art.

An existing first solution is to keep a downlink transmission wavelength unchanged, and to improve the transmission rate of the entire line by improving a baud rate of a signal sent by the OLT. The XG-PON is used as an example. As shown in FIG. 2, if the OLT improves the baud rate to 20 GBaud, a downlink line rate also reaches 20 Gbps, and a re-designed second ONU can correctly receive a signal whose baud rate is 20 GBaud. However, a deployed first ONU can receive only a signal whose baud rate is 10 GBaud, and when the first ONU receives the signal whose baud rate is 20 GBaud, a clock in a clock recovery circuit in a receiver of the first ONU cannot be locked, and consequently the ONU cannot correctly recover 1 and 0 in the signal, causing an extremely high bit error rate. Therefore, how to improve the transmission rate of the entire line and also consider a deployed ONU by improving the baud rate of a signal sent by the OLT is a difficulty that is currently faced.

SUMMARY

Embodiments of this application provide a passive optical network communication method, an apparatus, and a system, by improving a baud rate of a signal sent by an OLT, a transmission rate of an entire line is improved and a deployed ONU is also considered.

According to a first aspect, a passive optical network communication method is provided. The method includes: first, receiving an Ethernet packet, where the Ethernet packet carries an optical network unit identifier; and then looking up a correspondence between the optical network unit identifier and an optical network unit type based on the optical network unit identifier, to determine that an optical network unit that receives the Ethernet packet is a first type of optical network unit, where the optical network unit type includes the first type of optical network unit and a second type of optical network unit, and a packet receiving rate of the first type of optical network unit is different from a packet receiving rate of the second type of optical network unit; and next looking up a correspondence between the optical network unit type and a channel based on the first type of optical network unit, to determine a channel corresponding to the first type of optical network unit; and finally encapsulating the Ethernet packet into a GPON encapsulation method GEM frame and sending the GEM frame to the first type of optical network unit by using the determined channel.

In a possible design, a first correspondence table is looked up based on the first type of optical network unit, to determine that the channel corresponding to the first type of optical network unit is a first channel, and the first correspondence table includes a correspondence between the first type of optical network unit and the first channel.

In a possible design, a second correspondence table is looked up based on the first type of optical network unit and a type of a service flow carried in the Ethernet packet, to determine that the channel corresponding to the first type of optical network unit is a first channel, where the second correspondence table includes a correspondence between an optical network unit type, a type of a service flow, and a channel.

In a possible design, it is determined, based on the first type of optical network unit and an idle state of a channel, that the channel corresponding to the first type of optical network unit is a first channel or a second channel.

Optionally, if the first channel is idle, the channel corresponding to the first type of optical network unit is the first channel; if the second channel is idle, the channel corresponding to the first type of optical network unit is the second channel; or if both the first channel and the second channel are idle, the channel corresponding to the first type of optical network unit is the first channel.

In a possible design, when the first channel or the second channel is idle, a redundant code stream is generated and is sent to an idle channel, where the redundant code stream of the idle channel and a code stream of another channel are synchronously modulated.

In a possible design, the encapsulating the Ethernet packet into a GPON encapsulation method GEM frame includes: mapping, to a low bit of an output level, a bit output by the first channel, and mapping, to a high bit of an output level, a bit output by the second channel.

Optionally, the optical network unit identifier includes at least one of an ONU identifier (ONU-ID), a MAC address, a logical link identifier, and a serial number.

It can be learned that, in the embodiments of this application, an OLT sends, to the first type of optical network unit based on the optical network unit identifier carried in the Ethernet packet and by using the determined channel, the Ethernet packet of the determined first type of optical network unit that receives the Ethernet packet, and a packet forwarding rule by which is sent to the second type of optical network unit remains unchanged, so that by improving a baud rate of a signal sent by an OLT, a transmission rate of an entire line is improved and the deployed ONU is also considered.

According to a second aspect, an optical line terminal is provided, including: a receiving unit, configured to receive an Ethernet packet, where the Ethernet packet carries an optical network unit identifier; a first processing unit, configured to look up a correspondence between the optical network unit identifier and an optical network unit type based on the optical network unit identifier, to determine that an optical network unit that receives the Ethernet packet is a first type of optical network unit, where the optical network unit type includes the first type of optical network unit and a second type of optical network unit, and a packet receiving rate of the first type of optical network unit is different from a packet receiving rate of the second type of optical network unit; a second processing unit, configured to look up a correspondence between the optical network unit type and a channel based on the first type of optical network unit, to determine a channel corresponding to the first type of optical network unit; and an encapsulation unit, configured to encapsulate the Ethernet packet into a GPON encapsulation method GEM frame and send the GEM frame to the first type of optical network unit by using the determined channel.

In a possible design, the second processing unit looks up a first correspondence table based on the first type of optical network unit, to determine that the channel corresponding to the first type of optical network unit is a first channel, where the first correspondence table comprises a correspondence between the first type of optical network unit and the first channel.

In a possible design, the second processing unit looks up a second correspondence table based on the first type of optical network unit and a type of a service flow carried in the Ethernet packet, to determine that the channel corresponding to the first type of optical network unit is a first channel, where the second correspondence table includes a correspondence between an optical network unit type, a type of a service flow, and a channel.

In a possible design, the second processing unit determines, based on the first type of optical network unit and an idle state of a channel, that the channel corresponding to the first type of optical network unit is a first channel or a second channel.

Optionally, if determining that the first channel is idle, the second processing unit determines that the channel corresponding to the first type of optical network unit is the first channel; if determining that the second channel is idle, the second processing unit determines that the channel corresponding to the first type of optical network unit is the second channel; or if determining that both the first channel and the second channel are idle, the second processing unit determines that the channel corresponding to the first type of optical network unit is the first channel.

In a possible design, the encapsulation unit is configured to: map, to a low bit of an output level, a bit output by the first channel, and map, to a high bit of an output level, a bit output by the second channel.

Optionally, the optical network unit identifier includes at least one of an ONU-ID, a MAC address, a logical link identifier, and a serial number.

According to a third aspect, a passive optical network system is further provided, including the foregoing optical line terminal and optical network unit.

According to a fourth aspect, a computer readable medium is provided, and is configured to store a computer program. The computer program includes an instruction used to perform the method in any one of the first aspect or possible implementations of the first aspect.

DETAILED DESCRIPTION OF ILLUSTRATIVE EMBODIMENTS

The following describes the embodiments of this application with reference to the accompanying drawings.

Figure 3:
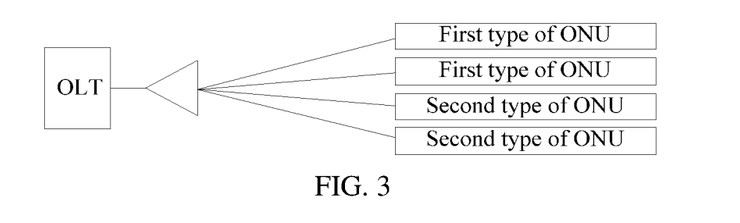
FIG. 3 is a schematic diagram of another passive optical network system in the prior art.

FIG. 3 is a schematic diagram of an application scenario according to an embodiment of this application. As shown in FIG. 3, an optical network unit includes a first type of optical network unit and a second type of optical network unit. The second type of optical network unit is an existing deployed optical network unit. The first type of optical network unit is an improved optical network unit in this application. A packet receiving rate of the first type of optical network unit is improved compared with a receiving rate of the second type of optical network unit. An XG-PON is used as an example. A transmission wavelength of an optical line terminal is not modified and still complies with an existing standard. However, a downlink rate is doubled, and a signal sent by the OLT changes from original two levels to four levels, and a quantity of bits (bit) carried by each level changes from original one to two. In other words, the sent signal is a pulse amplitude modulation (PAM) 4 signal. Therefore, when the baud rate remains unchanged, a total bit rate can be improved. The second type of optical network unit still uses non-return-to-zero (NRZ) decision, a decision level is unchanged, and a peak rate is still 10 Gbps. The first type of optical network unit may use a three-level decision or soft decision algorithm, to recover two bits for each level, and the peak rate can reach 20 Gbps.

Figure 4:
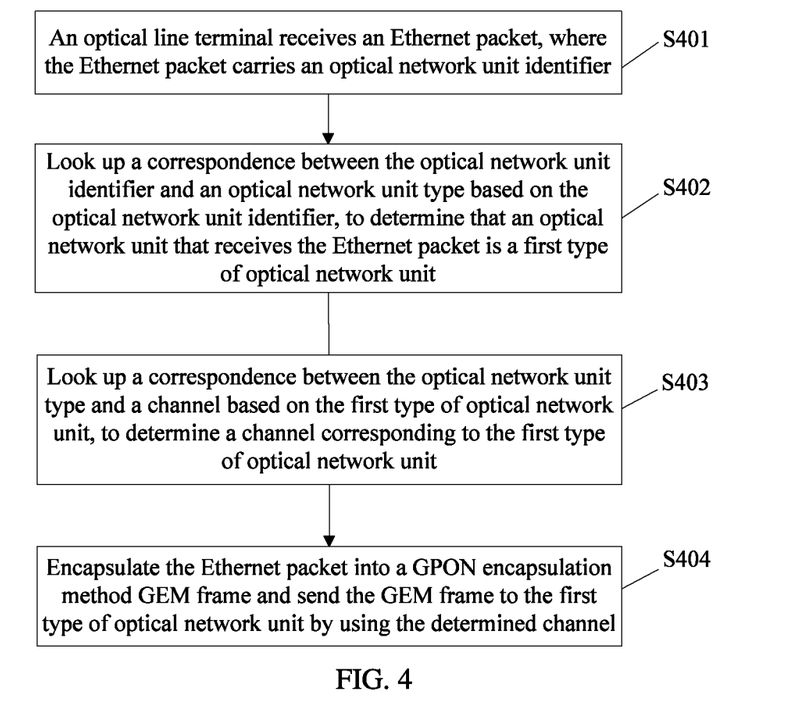
FIG. 4 is a flowchart of a passive optical network communication method according to an embodiment of this application.

FIG. 4 is a passive optical network communication method according to an embodiment of this application. The method includes the following steps.

S401: An optical line terminal receives an Ethernet packet, where the Ethernet packet carries an optical network unit identifier.

In a GPON system, the optical network unit identifier may include an Serial Number, serial number (SN), an ONU-ID, and the like. In an EPON system, the optical network unit identifier may include a Media Access Control (MAC) address, a Logical Link Identifier (LLID), and the like.

S402: The optical line terminal looks up a correspondence between the optical network unit identifier and an optical network unit type based on the optical network unit identifier, to determine that an optical network unit that receives the Ethernet packet is a first type of optical network unit.

The optical network unit type includes the first type of optical network unit and a second type of optical network unit. A packet receiving rate of the first type of optical network unit is different from a packet receiving rate of the second type of optical network unit, and the packet receiving rate of the first type of optical network unit is greater than the packet receiving rate of the second type of optical network unit.

S403: The optical line terminal looks up a correspondence between the optical network unit type and a channel based on the first type of optical network unit, to determine a channel corresponding to the first type of optical network unit.

S404: The optical line terminal encapsulates the Ethernet packet into a GPON encapsulation method (GEM) frame and sends the GEM frame to the first type of optical network unit by using the determined channel.

The encapsulation in the foregoing step is converting the Ethernet packet into the GEM frame.

It should be noted that, in the embodiment shown in FIG. 4, a serial number of each step does not mean an actual execution sequence of the steps. During actual application, each step may be performed according to any possible sequence.

In a possible design, the optical line terminal looks up a first correspondence table based on the first type of optical network unit, to determine that the channel corresponding to the first type of optical network unit is a first channel, and the first correspondence table includes a correspondence between the first type of optical network unit and the first channel. The first correspondence table may be shown in Table 1:

TABLE 1

| Optical network unit identifier | Optical network unit type | Bearer channel |
| --- | --- | --- |
| SN0001 | First type of optical network unit | First channel |
| SN0002 | First type of optical network unit | First channel |
| SN0003 | Second type of optical network unit | Second channel |

The first type of optical network unit in Table 1 corresponds to the first channel, the second type of optical network unit corresponds to the second channel, and the channel is used for independent distribution.

In a possible design, the optical line terminal looks up a second correspondence table based on the first type of optical network unit and a type of a service flow (for example, a video, a voice, or data) carried in the Ethernet packet, to determine that the channel corresponding to the first type of optical network unit is a first channel. The second correspondence table includes a correspondence between an optical network unit type, a type of a service flow, and a channel. The second correspondence table may be shown in Table 2:

TABLE 2

| Optical network unit type | Type of a service flow carried in Ethernet packet | Bearer channel |
| --- | --- | --- |
| First type of optical network unit | Video | First channel or second channel |
| First type of optical network unit | Voice | First channel or second channel |
| First type of optical network unit | Data | First channel |
| Second type of optical network unit | — | Second channel |

The optical line terminal OLT may establish in advance and maintain a correspondence between the optical network unit, the type of a service flow, the optical network unit identifier, and the bearer channel shown in Table 1 and Table 2. The established corresponding correspondence may be from a third-party apparatus, or may be from a gateway, or may be entered by using a command line.

In another embodiment, the optical line terminal determines, based on the first type of optical network unit and an idle state of a channel, that the channel corresponding to the first type of optical network unit is a first channel or a second channel. Optionally, if the first channel is idle, the channel corresponding to the first type of optical network unit is the first channel; if the second channel is idle, the channel corresponding to the first type of optical network unit is the second channel; or if both the first channel and the second channel are idle, the channel corresponding to the first type of optical network unit is the first channel.

An XG-PON is used as an example for description. In this embodiment, the first channel and the second channel may be XG Media Access Control (XGMAC) channels. The second channel is a basic XGMAC channel, and the first channel is an extended XGMAC channel. Working methods of the two channels are the same and suitable for an XG-PON system of an existing standard. Structures of the first channel and the second channel each include: a channel cache module, a downlink XG-PON encapsulation method (XGEM) frame module, a downlink XG-PON transmission convergence (XGTC) framing module, a forward error correction (FEC) coding module, and a scrambling module. For working principles of the modules, refer to the existing standard protocol ITU-T G987.3, and details are not described herein. In the XG-PON, the OLT receives an Ethernet packet data flow having a rate of 20 Gbps from an upper-layer network, and a receive queue cache may first cache the data flow, and then distribute, based on the foregoing distribution algorithm, the data flow to the first channel and the second channel to be cached. Rates of the first channel and the second channel each are 10 Gbps, thereby improving a transmission rate of an entire line.

In a possible design, that the optical line terminal encapsulates the Ethernet packet into the GPON encapsulation method GEM frame includes: mapping, by the optical line terminal to a low bit of an output level, a bit output by the first channel, and mapping, to a high bit of an output level, a bit output by the second channel. Specifically, for example, data output by the first channel is '0, 1, 0, 1, 1, 1, 0, 1', and data output by the second channel is '0, 0, 1, 1, 0, 1, 0, 1', and a total of four types of levels (0, 1, 2, 3) are output after modulation: '00', '10', '01', '11', '10', '11', '00', '11', the bit output by the first channel is used as a bit on the right (a low bit) after being modulated, and the bit output by the second channel is used as a bit on the left (a high bit) after being modulated. A modulation scheme is not limited, and the modulation may be performed, for example, by using PAM 4.

The bit mapping is schematically shown as follows:
(first channel 1, second channel 1) 11→3
(first channel 1, second channel 0) 10→2
(first channel 0, second channel 1) 01→1
(first channel 0, second channel 0) 00→0

In another embodiment, the optical line terminal in the foregoing embodiment may, when determining that the received Ethernet packet is sent to the second type of optical network unit, further copy the Ethernet packet and send the Ethernet packet to the first channel while sending the Ethernet packet to the second channel. The two signals are modulated at the same time, and two level signals 00 and 11 are output, so that an eye pattern of the two levels that are output after the modulation is larger.

In another embodiment, when the first channel or the second channel is idle and carries no downlink Ethernet packet, to implement synchronization with a code stream of the other channel, the OLT generates a redundant (Idle) code stream and sends the redundant code stream to the idle channel, and the redundant code stream corresponding to the idle channel and the code stream of the other channel are synchronously modulated. An XGEM port number of the channel on which the redundant code stream is located may be a special value, and the optical network unit performs reassembly based on the special value.

It should be noted that, the second type of optical network unit ONU does not have a function of reporting a type of the second type of optical network unit, and a newly-defined first type of ONU in this embodiment has a function of reporting a type of the newly-defined first type of ONU. The OLT establishes an ONU type table based on the type reported by the first type of ONU. The OLT may send an ONU type reporting request, and if receiving an ONU type returned by an ONU, the OLT considers the ONU as the first type of ONU, or if receiving, after time expires, no ONU type returned by an ONU, the OLT considers, as the second type of ONU, the ONU that does not feed back an ONU type.

It can be learned that, in this embodiment of this application, when an existing deployed optical network unit is not modified, an existing rule remains unchanged for the Ethernet packet sent to the second type of optical network unit, and the OLT sends, to the first type of optical network unit based on the optical network unit identifier carried in the Ethernet packet and by using the determined channel, the Ethernet packet of the determined first type of optical network unit that receives the Ethernet packet, so that by improving a baud rate of a signal sent by the OLT, a transmission rate of an entire line is improved and the deployed ONU is also considered.

Figure 5:
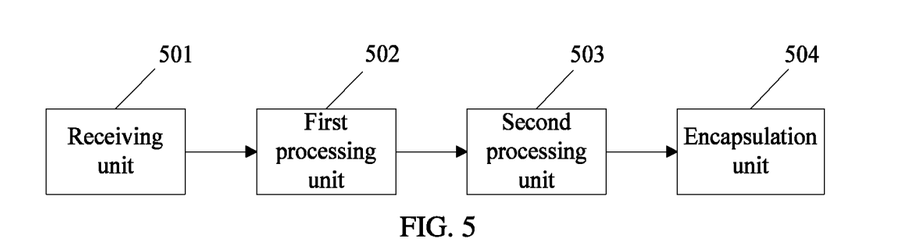
FIG. 5 is a schematic structural diagram of an optical line terminal according to an embodiment of this application.

As shown in FIG. 5, an embodiment of this application further provides an optical line terminal. The optical line terminal includes a receiving unit 501, a first processing unit 502, a second processing unit 503, and an encapsulation unit 504.

The receiving unit 501 is configured to receive an Ethernet packet, where the Ethernet packet carries an optical network unit identifier.

The first processing unit 502 is configured to look up a correspondence between the optical network unit identifier and an optical network unit type based on the optical network unit identifier, to determine that an optical network unit that receives the Ethernet packet is a first type of optical network unit.

The optical network unit type includes the first type of optical network unit and a second type of optical network unit, and a packet receiving rate of the first type of optical network unit is different from a packet receiving rate of the second type of optical network unit. For a re-designed first type of optical network unit, a receiving rate of the first type of optical network unit is improved compared with a receiving rate of the second type of optical network unit.

The second processing unit 503 is configured to look up a correspondence between the optical network unit type and a channel based on the first type of optical network unit, to determine a channel corresponding to the first type of optical network unit.

The encapsulation unit 504 is configured to encapsulate the Ethernet packet into a GPON encapsulation method GEM frame and send the GEM frame to the first type of optical network unit by using the determined channel.

The foregoing channel includes at least the first channel and the second channel. An XG-PON is used as an example for description. In this embodiment, the first channel and the second channel may be XGMAC (XG Media Access Control, XG Media Access Control) channels. The second channel is a basic XGMAC channel, and the first channel is an extended XGMAC channel. Working methods of the two channels are the same and suitable for an XG-PON system of an existing standard. Structures of the first channel and the second channel each include: a channel cache module, a downlink XGEM (XGPON Encapsulation Method) frame module, a downlink XGTC (XG-PON Transmission Convergence) framing module, a forward error correction (FEC) coding module, and a scrambling module. For working principles of the modules, refer to the existing standard protocol ITU-T G987.3, and details are not described herein. In the XG-PON, the OLT receives an Ethernet packet data flow having a rate of 20 Gbps from an upper-layer network, and a receive queue cache may first cache the data flow, and then distribute, based on the foregoing distribution algorithm, the data flow to the first channel and the second channel to be cached. Rates of the first channel and the second channel each are 10 Gbps, thereby improving a transmission rate of an entire line.

In an embodiment, the second processing unit 503 looks up a first correspondence table based on the first type of optical network unit, to determine that the channel corresponding to the first type of optical network unit is a first channel. The first correspondence table includes a correspondence between the first type of optical network unit and the first channel. The first correspondence table is described in the foregoing Table 1, and details are not described again.

In an embodiment, the second processing unit 503 looks up a second correspondence table based on the first type of optical network unit and a type of a service flow carried in the Ethernet packet, to determine that the channel corresponding to the first type of optical network unit is a first channel. The second correspondence table includes a correspondence between an optical network unit type, a type of a service flow, and a channel. The second correspondence table is described in the foregoing Table 2, and details are not described again.

In an embodiment, the second processing unit 503 determines, based on the first type of optical network unit and an idle state of a channel, that the channel corresponding to the first type of optical network unit is a first channel or a second channel.

Optionally, if determining that the first channel is idle, the second processing unit 503 determines that the channel corresponding to the first type of optical network unit is the first channel. If determining that the second channel is idle, the second processing unit 503 determines that the channel corresponding to the first type of optical network unit is the second channel. If determining that both the first channel and the second channel are idle, the second processing unit 503 determines that the channel corresponding to the first type of optical network unit is the first channel.

In an embodiment, the encapsulation unit 504 is configured to: map, to a low bit of an output level, a bit output by the first channel, and map, to a high bit of an output level, a bit output by the second channel. A specific implementation is described in the foregoing embodiments, and details are not described herein again.

Figure 6:
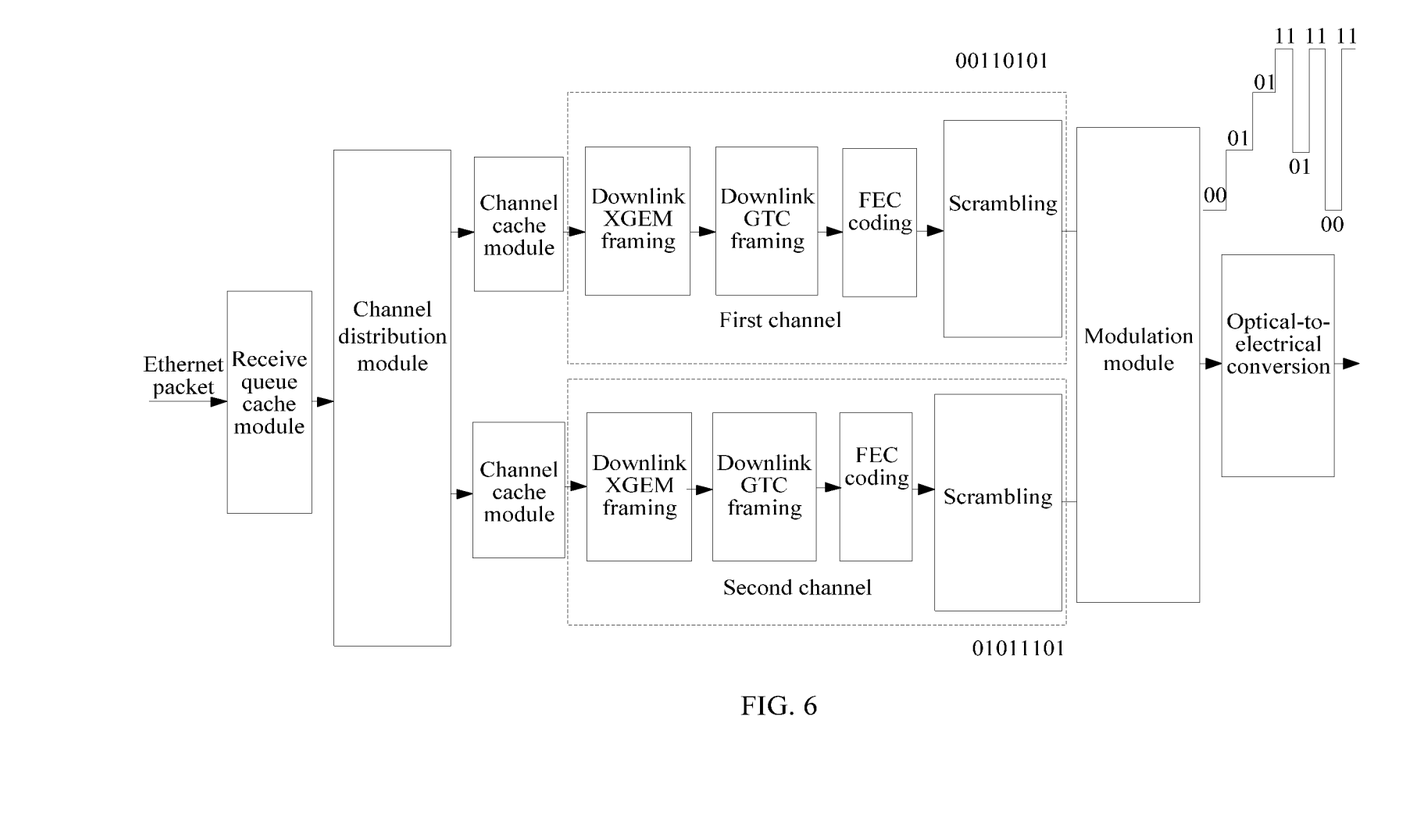
FIG. 6 is a schematic structural diagram of another optical line terminal according to an embodiment of this application.

In a specific implementation, as shown in FIG. 6, a receiving unit, a first processing unit, and a second processing unit may be used as a channel distribution module as a whole. The channel distribution module has all functions of the receiving unit, the first processing unit, and the second processing unit. The procedure performed by the encapsulation unit may be jointly completed by a first channel, a second channel, and a modulation module. The channel distribution module is connected to the modulation module by using the first channel and the second channel. The channel distribution module distributes, to the first channel and/or the second channel by using a channel cache and the method described in the foregoing embodiments, the Ethernet packet received from an upper-layer network. By using the channel cache, the first channel transmits the Ethernet packet distributed by the channel distribution module and performs frame format conversion on the Ethernet packet, and the second channel transmits the Ethernet packet distributed by the channel distribution module and performs frame format conversion on the Ethernet packet. The modulation module receives packets that are output by the first channel and the second channel and that are obtained after the frame format conversion, and performs modulation, for example, PAM4 modulation, to output multi-level signals, where each level carries two bits.

Figure 7:
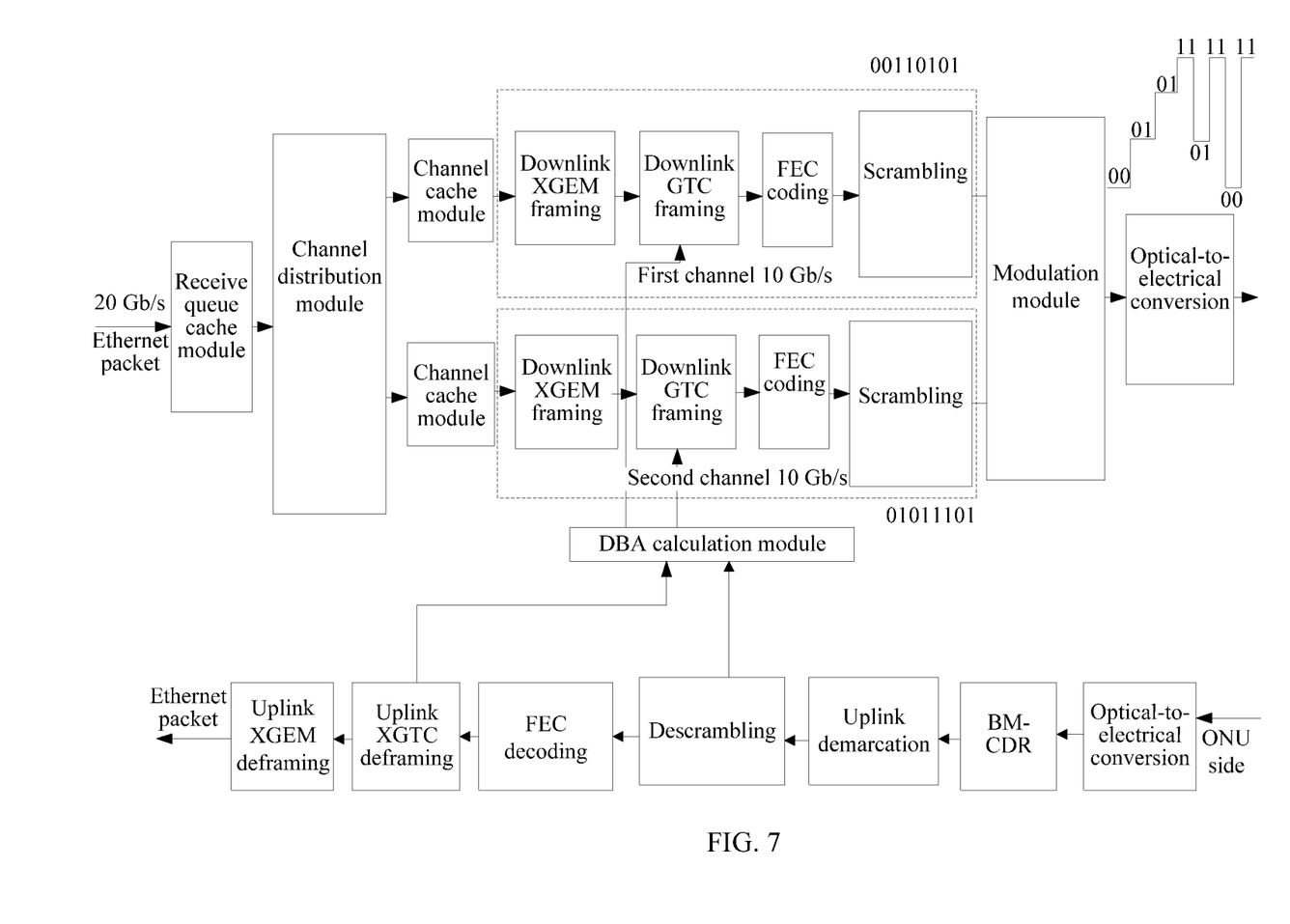
FIG. 7 is a schematic structural diagram of another optical line terminal according to an embodiment of this application.

As shown in FIG. 7, for the manner shown in FIG. 6, a DBA (Dynamic Bandwidth Allocation) calculation module is added to the OLT in this embodiment of this application, to collectively coordinate the first channel and the second channel to send uplink bandwidth authorization information. Because the OLT receives an uplink signal in a burst receive mode, the OLT needs to perform bandwidth authorization on the ONU, to seamlessly allocate a timeslot to the ONU based on an uplink to avoid a conflict. The ONU notifies the OLT based on a bandwidth requirement of the ONU by using an uplink packet, and the OLT extracts bandwidth requirement information from an uplink XGTC deframing module, and sends the bandwidth requirement information to the DBA calculation module. The DBA calculation module determines an uplink bandwidth allocation policy, and then notifies a result to the ONU by using a downlink channel. This embodiment includes the following several scenarios.

Scenario 1: When there is only the first type of ONU, only the second channel is instructed to send uplink authorization information.

Scenario 2: When the first type of ONU and the second type of ONU coexist, the DBA calculation module collectively coordinates uplink timeslot allocation, and the first channel and the second channel are separately instructed to send the uplink authorization information.

Scenario 3: When there is only the second type of ONU, only any one of channels is instructed to send the uplink authorization information, and the channel is notified to the ONU in advance, or the first channel or the second channel is fixedly instructed to send the information.

It can be learned that, in this embodiment of this application, when an existing deployed optical network unit is considered, an existing rule remains unchanged for the Ethernet packet sent to the second type of optical network unit, and the OLT sends, to the first type of optical network unit based on the optical network unit identifier carried in the Ethernet packet and by using the determined channel, the Ethernet packet of the determined first type of optical network unit that receives the Ethernet packet, so that by improving a baud rate of a signal sent by the OLT, a transmission rate of an entire line is improved and the deployed ONU is also considered.

Figure 8:
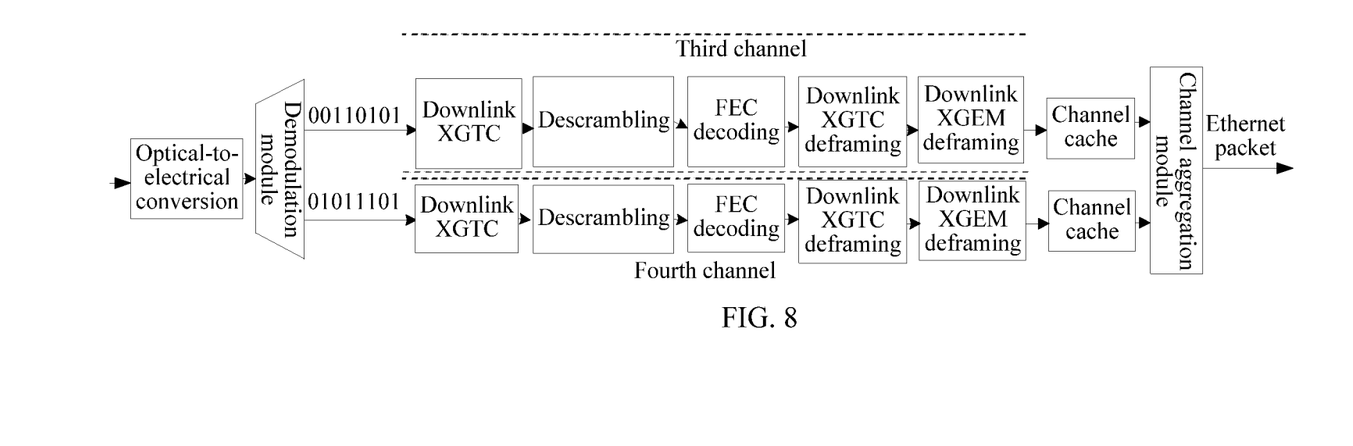
FIG. 8 is a schematic structural diagram of an optical network unit according to an embodiment of this application.

As shown in FIG. 8, an embodiment of this application further discloses an optical network unit. A difference between the optical network unit and an optical network unit defined in the existing standard protocol ITU-T G987.3 is that the optical network unit in this embodiment further includes a demodulation module 801 and a channel aggregation module. The demodulation module is connected to the channel aggregation module by using a third channel and a fourth channel. The demodulation module receives a signal obtained after optical-to-electrical conversion and demodulates the signal, and outputs two signals. One output signal is a bit stream (namely, a bit stream of a low bit) of the first channel of the OLT, and the other output signal is a bit stream (namely, a bit stream of a high bit) of the second channel of the OLT. One of the signals is sent to the third channel, and the other signal is sent to the fourth channel.

Similar to the first channel and the second channel of the OLT, the third channel and the fourth channel of the ONU in this embodiment may also be XGMAC channels. The third channel is a basic XGMAC channel, and the fourth channel is an extended XGMAC channel. Working methods of the two channels are the same and suitable for the XG-PON system defined in the existing standard protocol ITU-T G987.3. Structures of the third channel and the fourth channel each mainly include a downlink XGTC synchronization module, a descrambling module, an FEC decoding module, a downlink XGTC deframing module, a downlink X encapsulation mode deframing module, and the like. For the working principles of the modules, refer to the existing standard protocol ITU-G987.3. Details are not described herein.

For a first type of optical network unit in this embodiment of this application, after optical-to-electrical conversion is performed on the signal sent by the OLT, a demodulation module 801 performs demodulation decision, and outputs two signals, and outputs two signals. Certainly, a soft decision algorithm may be used. A rule by which the demodulation module 801 performs demodulation decision is exactly an inverse operation of an inner modulation module of the OLT, one output signal is a bit stream (that is, a bit stream of a low bit) of the first channel of the OLT, and the other output signal is a bit stream (that is, a bit stream of a high bit) of the second channel of the OLT. Both a third receive channel and a fourth receive channel receive data. Certainly, data received by an optical module may not be sent to the third channel but sent to only the fourth channel, and is correspondingly processed subsequently by using the downlink XGTC synchronization module, the descrambling module, FEC decoding module, the downlink XGTC deframing module, and the downlink XGEM deframing module. The XGEM module filters, based on an XGEM port number in the frame, a packet that is not sent to the XGEM module, and finally recovers the Ethernet packet flow. This receiving solution supports only the channel independent distribution solution at the foregoing OLT end.

For the foregoing receiving solution, the two channels in the first type of optical network unit ONU finally recover the Ethernet packet flow by using the channel aggregation module, and the aggregation algorithm of the channel aggregation module needs to be corresponding to the channel distribution algorithm of the OLT. If the OLT uses the channel independent distribution and distribution based on service flow, the Ethernet packet flows of the two channels are sent and received in sequence, and the channel aggregation module only needs to schedule the Ethernet packet flows in a queue based on a common priority. In other words, the Ethernet packet flows may be recovered in sequence. If the OLT uses the solution in which the two channels are distributed based on Ethernet packet load balance, because the Ethernet packets may be disordered during sending, the Ethernet packet flows need to be recovered in sequence at a receive end. In this case, a sequence number may be added to each Ethernet packet, and the channel aggregation module in the first type of ONU needs to recover the Ethernet packet flows in a sequence by using sequence numbers.

For the second type of optical network unit, an existing receiving solution is kept unchanged. A signal that is delivered to the OLT still uses the NRZ decision manner, and the decision level is also unchanged. In the NRZ decision, four levels are decided as two levels, two high levels are decided as 1, and two low levels are decided as 0, a bit stream that is sent by the OLT is recovered, and then corresponding processing is performed subsequently by a downlink XGTC synchronization module, a descrambling module, an FEC decoding module, a downlink XGTC deframing module, and a downlink XGEM deframing module. The downlink XGEM deframing module filters, based on an XGEM port number in the XGEM frame, a packet that is not sent to the downlink XGEM deframing module, and finally recovers the Ethernet packet.

Figure 9:
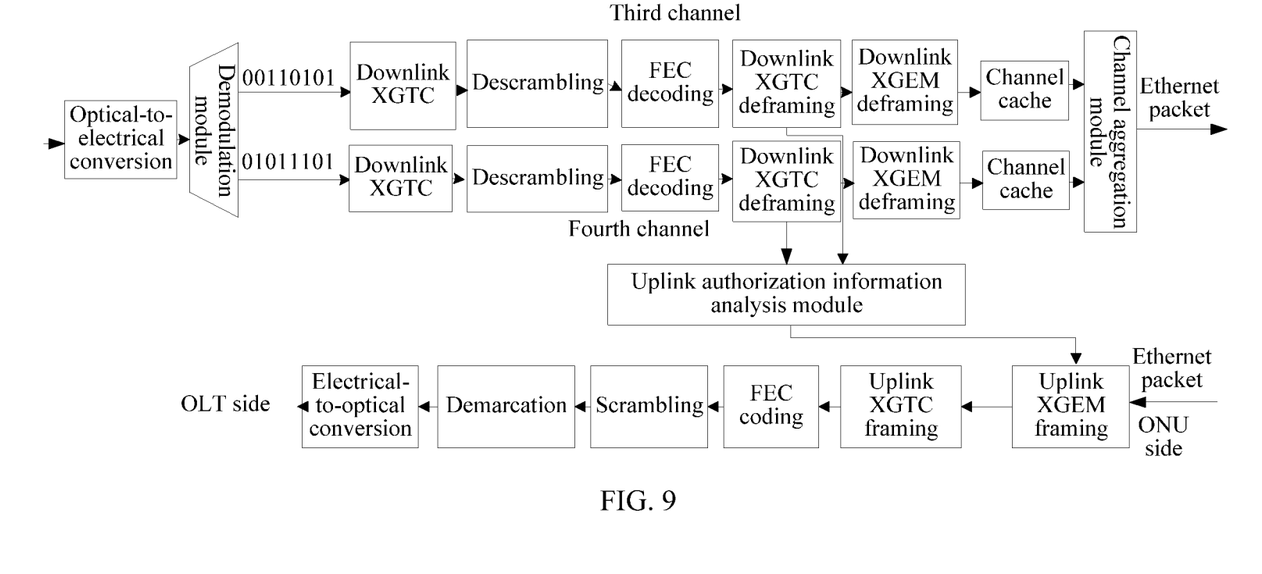
FIG. 9 is a schematic structural diagram of another optical network unit according to an embodiment of this application.

As shown in FIG. 9, both the two downlink channels of the first type of ONU may extract uplink bandwidth authorization information of the OLT for the first type of ONU by using an uplink authorization information analysis module, or the uplink bandwidth authorization information is fixedly carried by the third channel or the fourth channel, and then an XGEM framing module in the uplink channel is instructed, based on an allocated timeslot, to send data of corresponding duration. The data passes through an uplink XGTC framing module, a scrambling module, and a demarcation module, and is then sent to the OLT by using an electrical-to-optical conversion module. For the working principle of the foregoing modules, refer to the existing standard protocol ITU-G987.3. Details are not described herein.

The foregoing is merely an example description using two channels, and in practice, a plurality of channels may be selected as required. For example, in the 40G PON system, three first channels and one second channel may be always selected to jointly implement transmission at a rate of 40 Gbps.

It can be learned that, by using the foregoing solutions, the first type of ONU may receive packet data that is delivered by the OLT and whose transmission rate is improved, without affecting the second type of ONU when the second type of ONU normally receives packet data delivered by the OLT, so that by improving a baud rate of a signal sent by the OLT, a transmission rate of an entire line is improved and the deployed ONU is also considered.

Figure 10:
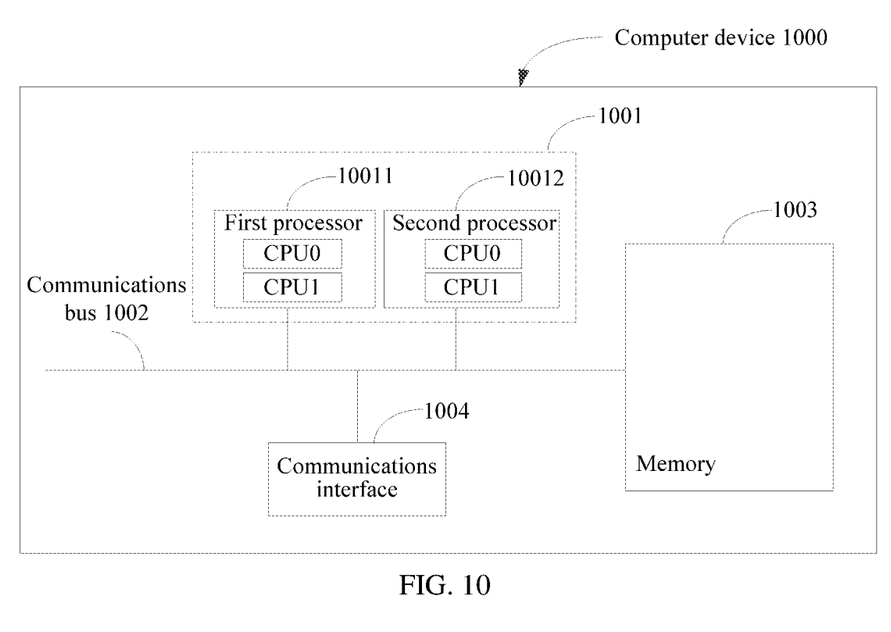
FIG. 10 is a schematic structural diagram of a computer device according to an embodiment of this application.

FIG. 10 is a schematic diagram of a computer device 1000 according to an embodiment of this application. The computer device 1000 includes at least one processor 1001, a communications bus 1002, a memory 1003, and at least one communications interface 1004. The processor 1001 may be a general central processing unit (CPU), a microprocessor, an application-specific integrated circuit (ASIC), or one or more integrated circuits configured to control execution of a program in the solutions of this application.

The communications bus 1002 may include a path for transmitting information between the foregoing components. The communications interface 1004 uses any apparatus of a transceiver type, to communicate with another device or a communications network, such as Ethernet, a radio access network (RAN), or a wireless local area network (WLAN).

The memory 1003 may be a read-only memory (read-only memory, ROM) or another type of static storage device that can store static information and a static instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible to a computer, but is not limited thereto. The memory 1003 may independently exist and is connected to the processor 1001 by using the bus. The memory 1003 may alternatively be integrated with the processor 1001.

The memory 1003 is configured to store application program code for performing the solutions of this application, and execution of the application program code is controlled by the processor 1001. The processor 1001 is configured to execute the application program code stored in the memory 1003. The memory 1003 may store one or more software modules, and the stored software modules may be implemented by using the processor 1001 and the program code in the memory 1003, to improve a bit transmission rate of an OLT. Specifically, the program code stored in the memory 1003 may be invoked by using the processor 1001, to receive an Ethernet packet. The Ethernet packet carries an optical network unit identifier, and then a correspondence between the optical network unit identifier and an optical network unit type is looked up based on the optical network unit identifier, to determine that an optical network unit that receives the Ethernet packet is a first type of optical network unit. In addition, based on the first type of optical network unit, a correspondence between the optical network unit type and a channel is determined, to determine a channel corresponding to the first type of optical network unit. Finally, the Ethernet packet is encapsulated into a GEM frame and the GEM frame is sent to the first type of optical network unit by using the determined channel.

During specific implementation, in an embodiment, the processor 1001 may include one or more CPUs, for example, a CPU 0 and a CPU 1 in FIG. 10.

During specific implementation, in an embodiment, the computer device 1000 may include a plurality of processors 1001, for example, a first processor 10011 and a second processor 10012 in FIG. 10. The first processor 10011 and the second processor 10012 are named differently and have different reference numerals only for distinguishing between the plurality of processors 1001. Each of the processors 1001 may be a single-core (single-CPU) processor 1001, or may be a multi-core (multi-CPU) processor 1001. Herein, the processor 1001 may refer to one or more devices, circuits, and/or processing cores used to process data (for example, a computer program instruction).

The computer device 1000 may be a hardware module in the OLT, or may be a general computer device or a dedicated computer device. This embodiment of this application does not limit a type of the computer device 1000.

It can be learned that, in this embodiment of this application, when an existing deployed optical network unit is considered, an existing rule remains unchanged for the Ethernet packet sent to a second type of optical network unit, and the optical line terminal sends, to the first type of optical network unit based on the optical network unit identifier carried in the Ethernet packet and by using the determined channel, the Ethernet packet of the determined first type of optical network unit that receives the Ethernet packet, so that by improving a baud rate of a signal sent by the optical line terminal, a transmission rate of an entire line is improved and the deployed optical network unit is also considered.

The foregoing is merely an example description using an XG-PON, the passive optical network system provided in this embodiment of this application may alternatively be a 40G PON, a 100G PON, or the like. This is not limited. This application is not only applicable to the PON field, but also applicable to another point-to-point communications system. In the point-to-point communications system, such as an Ethernet communications system, a rate is improved by jointly using a plurality of channels while a wavelength is kept unchanged. A related PON field is simpler, because compatibility between an old node and a new node does not need to be considered during the point-to-point communication.

A person of ordinary skill in the art may be aware that, the units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into a same electrical component or chip, or some features may be ignored or not performed.

Functional units in the embodiments of this application may be integrated into one processing unit, or each of the units may exist alone physically, or two or more units are integrated into one unit. The foregoing integrated unit may be implemented in a form of hardware, software, or a combination of software and hardware. The software program may be stored in a readable storage medium, and when the program runs, the corresponding steps in the foregoing method are performed. The foregoing storage medium may be a ROM/RAM, a magnetic disk, an optical disk, or the like.

The foregoing descriptions are merely specific embodiments of this application, but are not intended to limit the protection scope of this application. Any equivalent modification or replacement readily figured out by a person skilled in the art within the technical scope disclosed in this application, for example, the channel may not only be double channels but may further be extended to a plurality of transmission channels, shall fall within the protection scope of this application. Therefore, the protection scope of this application shall be subject to the protection scope of the claims.

What is claimed is:

1. A passive optical network communication method, comprising:
   receiving, by an optical line terminal (OLT), an Ethernet packet, wherein the Ethernet packet carries an optical network unit identifier;
   determining, by the OLT, a correspondence between the optical network unit identifier and an optical network unit type according to the optical network unit identifier, and determining that an optical network unit that receives the Ethernet packet is a first type of optical network unit, wherein the optical network unit type comprises the first type of optical network unit and a second type of optical network unit, and wherein a packet receiving rate of the first type of optical network unit is different from a packet receiving rate of the second type of optical network unit;
   determining, by the OLT, a correspondence between the optical network unit type and a channel according to the first type of optical network unit and further according to a type of a service flow carried in the Ethernet packet, and determining a first channel corresponding to the first type of optical network unit;
   encapsulating, by the OLT, the Ethernet packet into a gigabit-capable passive optical network (GPON) encapsulation method (GEM) frame, wherein the encapsulating the Ethernet packet into the GEM frame comprises mapping, to a low bit of an output level, a bit that is output by the first channel, or mapping, to a high bit of an output level, a bit that is output by the second channel; and sending the GEM frame using the first channel.

2. The communication method according to claim 1, wherein the determining the correspondence between the optical network unit type and the channel according to the first type of optical network unit, and determining the first channel corresponding to the first type of optical network unit comprises:
   determining a first correspondence table based on the first type of optical network unit, and determining that the channel corresponding to the first type of optical network unit is a first channel, wherein the first correspondence table comprises a correspondence between the first type of optical network unit and the first channel.

3. The communication method according to claim 1, wherein the determining the correspondence between the optical network unit type and the channel according to the first type of optical network unit, and determining the first channel corresponding to the first type of optical network unit comprises:
   determining a second correspondence table according to the first type of optical network unit and the type of the service flow carried in the Ethernet packet, and determining that the channel corresponding to the first type of optical network unit is a first channel or a second channel, wherein the second correspondence table comprises a correspondence between an optical network unit type, the type of a service flow, and the channel.

4. The communication method according to claim 1, wherein the determining the correspondence between the optical network unit type and the channel according to the first type of optical network unit, and determining the first channel corresponding to the first type of optical network unit comprises:
   determining, according to the first type of optical network unit and an idle state of a channel, that the channel corresponding to the first type of optical network unit is a first channel or a second channel.

5. The communication method according to claim 4, wherein the determining, according to the first type of optical network unit and the idle state of a channel, that the channel corresponding to the first type of optical network unit is the first channel or the second channel comprises:
   determining, in response to the first channel being idle, that the first channel corresponding to the first type of optical network unit is the first channel;
   determining, in response to the second channel being idle, that the first channel corresponding to the first type of optical network unit is the second channel; or
   determining, in response to both the first channel and the second channel being idle, that the first channel corresponding to the first type of optical network unit is the first channel.

6. The communication method according to claim 1, wherein the optical network unit identifier comprises at least one of an optical network unit (ONU) identifier (ONU-ID), a Media Access Control (MAC) address, a logical link identifier, or a serial number.

7. An optical line terminal, comprising:
   a receiving unit, configured to receive an Ethernet packet, wherein the Ethernet packet carries an optical network unit identifier;
   one or more processors; and
   a non-transitory computer-readable storage medium storing a program to be executed by the one or more processors, the program including instructions to:
      determine a correspondence between the optical network unit identifier and an optical network unit type according the optical network unit identifier, and determine that an optical network unit that receives the Ethernet packet is a first type of optical network unit, wherein the optical network unit type comprises the first type of optical network unit and a second type of optical network unit, and wherein a packet receiving rate of the first type of optical network unit is different from a packet receiving rate of the second type of optical network unit;
      determine a correspondence between the optical network unit type and a channel according to the first type of optical network unit and further according to a type of a service flow carried in the Ethernet packet, and determine a first channel corresponding to the first type of optical network unit;
      encapsulate the Ethernet packet into a gigabit-capable passive optical network (GPON) encapsulation method (GEM) frame, wherein the instructions to encapsulate the Ethernet packet into the GEM frame include instructions to map, to a low bit of an output level, a bit that is output by the first channel, or map, to a high bit of an output level, a bit that is output by the second channel; and
      send the GEM frame on the first channel.

8. The optical line terminal according to claim 7, wherein the instructions to determine the correspondence between the optical network unit type and the channel according to the first type of optical network unit, and determine the first channel corresponding to the first type of optical network unit include instructions to determine a first correspondence table based on the first type of optical network unit, to determine that the channel corresponding to the first type of optical network unit is a first channel, and wherein the first correspondence table comprises a correspondence between the first type of optical network unit and the first channel.

9. The optical line terminal according to claim 7, wherein the instructions to determine the correspondence between the optical network unit type and the channel according to the first type of optical network unit, and determine the first channel corresponding to the first type of optical network unit include instructions to determine a second correspondence table according to the first type of optical network unit and the type of the service flow carried in the Ethernet packet, and determine that the first channel corresponding to the first type of optical network unit is a first channel or a second channel, wherein the second correspondence table comprises a correspondence between an optical network unit type, the type of the service flow, and the channel.

10. The optical line terminal according to claim 7, wherein the instructions to determine the correspondence between the optical network unit type and the channel according to the first type of optical network unit, and determine the first channel corresponding to the first type of optical network unit include instructions to determine, according to the first type of optical network unit and an idle state of a channel, that the channel corresponding to the first type of optical network unit is a first channel or a second channel.

11. The optical line terminal according to claim 10, wherein the instructions to determine, according to the first type of optical network unit and the idle state of a channel, that the first channel corresponding to the first type of optical network unit is the first channel or the second channel include instructions to:

determine, in response to the first channel being idle, that the first channel corresponding to the first type of optical network unit is the first channel;

determine, in response to the second channel being idle, that the first channel corresponding to the first type of optical network unit is the second channel; or determine, in response to both the first channel and the second channel being idle, that the first channel corresponding to the first type of optical network unit is the first channel.

12. The optical line terminal according to claim 7, wherein the optical network unit identifier comprises at least one of an optical network unit (ONU) identifier (ONU-ID), a Media Access Control (MAC) address, a logical link identifier, or a serial number.

13. A passive optical network system, comprising:
an optical network unit; and:
an optical line terminal, comprising:
    a receiving unit, configured to receive an Ethernet packet, wherein the Ethernet packet carries an optical network unit identifier;
    one or more processors; and
    a non-transitory computer-readable storage medium storing a program to be executed by the one or more processors, the program including instructions to:
        determine a correspondence between the optical network unit identifier and an optical network unit type according the optical network unit identifier, and determine that an optical network unit that receives the Ethernet packet is a first type of optical network unit, wherein the optical network unit type comprises the first type of optical network unit and a second type of optical network unit, and wherein a packet receiving rate of the first type of optical network unit is different from a packet receiving rate of the second type of optical network unit;
        determine a correspondence between the optical network unit type and a channel according to the first type of optical network unit and further according to a type of a service flow carried in the Ethernet packet, and determine a first channel corresponding to the first type of optical network unit;
        encapsulate the Ethernet packet into a gigabit-capable passive optical network (GPON) encapsulation method (GEM) frame, wherein the instructions to encapsulate the Ethernet packet into the GEM frame include instructions to map, to a low bit of an output level, a bit that is output by the first channel, or map, to a high bit of an output level, a bit that is output by the second channel; and
        send the GEM frame on the first channel.

14. The passive optical network system according to claim 13, wherein the instructions to determine the correspondence between the optical network unit type and the channel according to the first type of optical network unit, and determine the first channel corresponding to the first type of optical network unit include instructions to determine a first correspondence table based on the first type of optical network unit, to determine that the first channel corresponding to the first type of optical network unit is a first channel, and wherein the first correspondence table comprises a correspondence between the first type of optical network unit and the first channel.

15. The passive optical network system according to claim 13, wherein the instructions to determine the correspondence between the optical network unit type and the channel according to the first type of optical network unit, and determine the first channel corresponding to the first type of optical network unit include instructions to determine a second correspondence table according to the first type of optical network unit and the type of the service flow carried in the Ethernet packet, and determine that the first channel corresponding to the first type of optical network unit is a first channel or a second channel, wherein the second correspondence table comprises a correspondence between an optical network unit type, the type of the service flow, and the channel.

16. The passive optical network system according to claim 13, wherein the instructions to determine the correspondence between the optical network unit type and the first channel according to the first type of optical network unit, and determine the channel corresponding to the first type of optical network unit include instructions to determine, according to the first type of optical network unit and an idle state of a channel, that the first channel corresponding to the first type of optical network unit is a first channel or a second channel.

17. The passive optical network system according to claim 13, wherein the optical network unit identifier comprises at least one of an optical network unit (ONU) identifier (ONU-ID), a Media Access Control (MAC) address, a logical link identifier, or a serial number.

18. A device, comprising:
a receiving unit, configured to receive an Ethernet packet, wherein the Ethernet packet carries an optical network unit identifier;
a first processing unit, configured to determine a correspondence between the optical network unit identifier and an optical network unit type according the optical network unit identifier, and determine that an optical network unit that receives the Ethernet packet is a first type of optical network unit, wherein the optical network unit type comprises the first type of optical network unit and a second type of optical network unit, and wherein a packet receiving rate of the first type of optical network unit is different from a packet receiving rate of the second type of optical network unit;
a second processing unit, configured to determine a correspondence between the optical network unit type and a channel according to the first type of optical network unit and further according to a type of a service flow carried in the Ethernet packet, and determine a first channel corresponding to the first type of optical network unit, wherein the channel is a first channel or a second channel;
an encapsulation unit, configured to:
encapsulate the Ethernet packet into a gigabit-capable passive optical network (GPON) encapsulation method (GEM) frame by mapping, to a low bit of an output level, a bit that is output by the first channel, or mapping, to a high bit of an output level, a bit that is output by the second channel; and
send the GEM frame on the first channel.

19. A passive optical network communication method, comprising:
receiving, by an optical line terminal (OLT), an Ethernet packet, wherein the Ethernet packet carries an optical network unit identifier;
determining, by the OLT, based on a correspondence between the optical network unit identifier and an optical network unit type, a second type of optical network unit according to the optical network unit identifier;

determine a first channel corresponding to the second type of optical network unit according to the second type of optical network unit and further according to a type of a service flow carried in the Ethernet packet;

encapsulating, by the OLT, the Ethernet packet into a XGPON encapsulation method (XGEM) frame by mapping, to a low bit of an output level, a bit that is output by the first channel, or mapping, to a high bit of an output level, a bit that is output by the second channel; and sending the XGEM frame on the first channel.

* * * * *